(12) United States Patent
Machate et al.

(10) Patent No.: US 11,990,953 B2
(45) Date of Patent: May 21, 2024

(54) LIGHT TRUNKING SYSTEM HAVING DATA TRANSMISSION FUNCTION

(71) Applicant: ZUMTOBEL LIGHTING GMBH, Dornbirn (AT)

(72) Inventors: Andreas Machate, Dornbirn (AT); Gerald Ladstätter, Dornbirn (AT)

(73) Assignee: Zumtobel Lighting GmbH, Dornbirn (AT)

(*) Notice: Subject to any disclaimer, the term of this patent is extended or adjusted under 35 U.S.C. 154(b) by 181 days.

(21) Appl. No.: 17/639,954

(22) PCT Filed: Sep. 3, 2020

(86) PCT No.: PCT/EP2020/074637
§ 371 (c)(1),
(2) Date: Mar. 3, 2022

(87) PCT Pub. No.: WO2021/043921
PCT Pub. Date: Mar. 11, 2021

(65) Prior Publication Data
US 2022/0329286 A1    Oct. 13, 2022

(30) Foreign Application Priority Data
Sep. 3, 2019 (DE) .................. 20 2019 104 854.9

(51) Int. Cl.
*H04B 3/54* (2006.01)
*F21V 21/35* (2006.01)
(Continued)

(52) U.S. Cl.
CPC ............ *H04B 3/542* (2013.01); *F21V 21/35* (2013.01); *F21V 23/06* (2013.01); *F21V 23/045* (2013.01)

(58) Field of Classification Search
CPC ........................................................ H04B 3/542
(Continued)

(56) References Cited

U.S. PATENT DOCUMENTS

| 8,915,609 B1 | 12/2014 | Shah et al. |
| 2006/0056855 A1 | 3/2006 | Nakagawa et al. |

(Continued)

FOREIGN PATENT DOCUMENTS

| CN | 106793399 | 5/2017 |
| DE | 19610381 A1 | 9/1997 |

(Continued)

OTHER PUBLICATIONS

PCT/EP2020/074637 International Search Report and Written Opinion dated Nov. 3, 2020, 10 pages and English translation, 8 pages.
(Continued)

*Primary Examiner* — Joseph Chang
(74) *Attorney, Agent, or Firm* — Andrus Intellectual Property Law, LLP

(57) ABSTRACT

The present invention relates to a light trunking system, comprising: at least one trunking rail (6) for fastening components (7 ... 13) of the light trunking system (1) to the trunking rail (6); electrical lines (L3, L4), which run in the trunking rail (6) and can be contacted by the components (7 ... 13) in order to supply power to the components (7 ... 13); a data terminal (D1, D2) for receiving data; and a first adapter (16), which is connected to the electrical lines (L3, L4) and to the data terminal and is designed to transmit data received by the data terminal (D1, D2) to a second adapter (17) via the electrical lines (L3, L4) by means of a modulation method.

13 Claims, 5 Drawing Sheets

(51) Int. Cl.
*F21V 23/06* (2006.01)
*F21V 23/04* (2006.01)

(58) Field of Classification Search
USPC .......................................................... 307/155
See application file for complete search history.

(56) References Cited

U.S. PATENT DOCUMENTS

2014/0217906 A1    8/2014  Vo et al.
2017/0074471 A1*   3/2017  Panek .................... F21V 17/12

FOREIGN PATENT DOCUMENTS

| | | |
|---|---|---|
| DE | 10 2009 054510 A1 | 6/2011 |
| DE | 10 2011 007416 A1 | 10/2012 |
| DE | 10 2014 205892 A1 | 10/2015 |
| DE | 10 2016 011815 B3 | 2/2018 |
| EP | 3203814 A1 | 8/2017 |
| WO | 2012089355 A1 | 7/2012 |
| WO | 2013024460 A2 | 2/2013 |
| WO | 2017194310 A1 | 11/2017 |

OTHER PUBLICATIONS

Austrian Application No. GM 50220/2019, Austrian Search Report dated Jan. 15, 2024, 1 page.

* cited by examiner

LIGHT TRUNKING SYSTEM HAVING DATA TRANSMISSION FUNCTION

CROSS-REFERENCE TO RELATED APPLICATION

The present application is the U.S. national stage application of international application PCT/EP2020/074637 filed Sep. 3, 2020, which international application was published on Mar. 11, 2021 as International Publication WO 2021/043921 A1. The international application claims priority to German Patent Application 20 2019 104 854.9 filed Sep. 3, 2019.

FIELD OF THE INVENTION

The invention relates to a system for transmitting control signals or data between components of a lighting system.

BACKGROUND OF THE INVENTION

In building automation, control devices receive signals from sensors and transmit control signals to luminaires or other devices via cables or by means of a wireless transmission method.

WO 2012/089355 A1 discloses a safety or emergency lighting system with which a control device transmits radio signals for controlling the prescribed, regular function checks to the safety lights directly or by means of repeaters.

A lighting system in which ceiling lights are equipped with a radio network module in order to provide Internet access for WLAN-enabled devices is disclosed in DE 10 2011 007416 A1.

However, the quality and range of a radio link in buildings depends greatly upon the spatial conditions. In particular, walls and fixtures can impair radio transmission. The use of repeaters in radio transmission or the laying of separate cables for the data and/or signal transmission is complicated and expensive.

SUMMARY OF THE INVENTION

The invention is based upon the aim of specifying a device that alleviates the described problems. The aim is, in particular, to provide a light trunking system and a component for a light trunking system, by means of which control signals and/or data can be transmitted without high technical complexity and which is flexible with respect to the positioning of the transmitting and/or receiving devices.

This aim is achieved according to the features of the independent claims. The invention is developed by the features of the dependent claims.

According to the present invention, the signal and/or data are transmitted by means of a light trunking system, which comprises at least one trunking rail for fastening components of the light trunking system, electrical lines that run in the trunking rail and can be contacted by the components in order to supply power to the components, a data terminal for receiving data, and a first adapter that is connected to the electrical lines and to the data terminal. The data terminal is designed to transmit data, received by the data terminal, by means of a modulation method via the electrical lines to a second adapter. The data transmission can serve to control the components of the light trunking system or other components of the illumination system that are part of the light trunking system. Additionally or alternatively, data external to the system can also be transmitted from another network to a device connected to the light trunking system. The data can be transmitted in both directions between the first and the second adapters.

Because the data are transmitted via the electrical lines that run in the trunking rail and are present in the rail in order to supply power to the components, no additional lines have to be laid. The feeding of the data into the electrical lines and the data tapping from the electrical lines can take place at any locations on the trunking rail, so that the positioning of the transmitting and/or receiving devices is highly flexible. By using the lines in the trunking rail, a type of local network is created within which the data are transmitted. The building-side power supply network therefore remains unaffected.

The electrical lines can be designed as busbars, wherein the light trunking system has a busbar feeder for feeding current for the components into the busbars, and the first adapter is integrated into the busbar feeder. This simplifies the design and reduces the susceptibility to interference of the data transmission and the interference of other devices due to the data transmission, because the first adapter integrated into the busbar feeder is located within the trunking rail, and interferences are shielded from the trunking rail. By means of the feeder, it is ensured that the network formed by the trunking rail, for data transmission, is separated from the building-side power supply network, and therefore only local data communication is effected by means of the trunking rail. In this case, the feeder can also have a function that processes externally-received data with regard to its content or protocol for transmission by means of the trunking rail.

The data terminal can be integrated into the busbar feeder, which simplifies the construction and the assembly.

The first adapter can be a powerline/powerLAN adapter.

The data can be fed into the light trunking system from outside in a wired or wireless manner, wherein the data terminal can be an Ethernet connection or a WLAN connection.

The electrical lines in the trunking rail can be arranged such that they can be contacted by the components at any location along the trunking rail.

According to the present invention, a component for a light trunking system that has a trunking rail and electrical lines that run in the trunking rail and can be contacted by the component in order to supply power to the component has means for fastening the component to the trunking rail, means for contacting the electrical lines, and a second adapter connected to the electrical lines. The second adapter is designed to transmit data via the electrical lines by means of a modulation method and/or to receive data, transmitted via the electrical lines, by means of a demodulation method. For example, the second adapter can in this way exchange data with a first adapter, which can be the first adapter of the above-described first adapter connected to the data terminal or another adapter located outside the light trunking system and connected to the supply cable of the light trunking system or the electrical lines.

In addition, the component can have an interface for wired or wireless input of the data to be transmitted by the second adapter or output of the data received from the second adapter. The interface can have a terminal for connecting a LAN cable.

So that no separate power supply has to be provided for a device connected to the interface, the interface can be designed to supply power to the device connected thereto. In particular, this power supply can take place via Ethernet PoE (Power over Ethernet).

Alternatively or additionally, the component can have a beam element on which at least the means for fastening the component to the trunking rail and the second adapter are attached and which at least partially seals or closes off an opening in the trunking rail if the component is fastened to the trunking rail, which is U-shaped in cross-section.

The second adapter can be arranged on the beam element in such a way that it is located inside the trunking rail when the component is fastened to the trunking rail. The second adapter can have at least one indicator light that indicates a specific state of the second adapter or a specific status of the connection between the first adapter and the second adapter. In order to make the signal of the indicator light visible for a person when the component is in the mounted state, the component can have a light guide for forwarding the light of the indicator light, wherein the light guide leads from the indicator light to an outer side of the beam element.

The second adapter can be designed as a circuit board—in particular, a powerline circuit board.

Alternatively or additionally, the second adapter can be designed to transmit the data in encrypted form or to receive and decrypt encrypted data. For the activation of the encrypted data transmission or the coupling of the adapters, a pushbutton connected to the second adapter can be arranged on the beam element, by means of which pushbutton a user can trigger or confirm a request for an encrypted data transmission between the first adapter and the second adapter, and/or a code that can be read by machine and/or by the user can be attached to the beam element, by means of which code the request can be triggered or confirmed. The code can be a camera-readable barcode or 2-D code, or be stored in a passive RFID tag mounted on the beam element.

Alternatively or additionally, the component can have a control device that is designed to control the component based upon the received data and/or to generate a control signal for another component of the light trunking system based upon the received data.

According to the present invention, a light trunking system has the trunking rail, the electrical lines, and at least one of the components described above.

In addition, the light trunking system can have the first adapter and a data terminal, wherein the first adapter is connected to the electrical lines and the data terminal, and is configured to transmit data, received from the data terminal, by means of the modulation method via the electrical lines to the second adapter.

BRIEF DESCRIPTION OF THE DRAWINGS

The invention is explained in more detail in the following using the accompanying drawings. The following are shown.

Components with the same functions are identified by the same reference signs in the figures.

DETAILED DESCRIPTION

Figure 1:
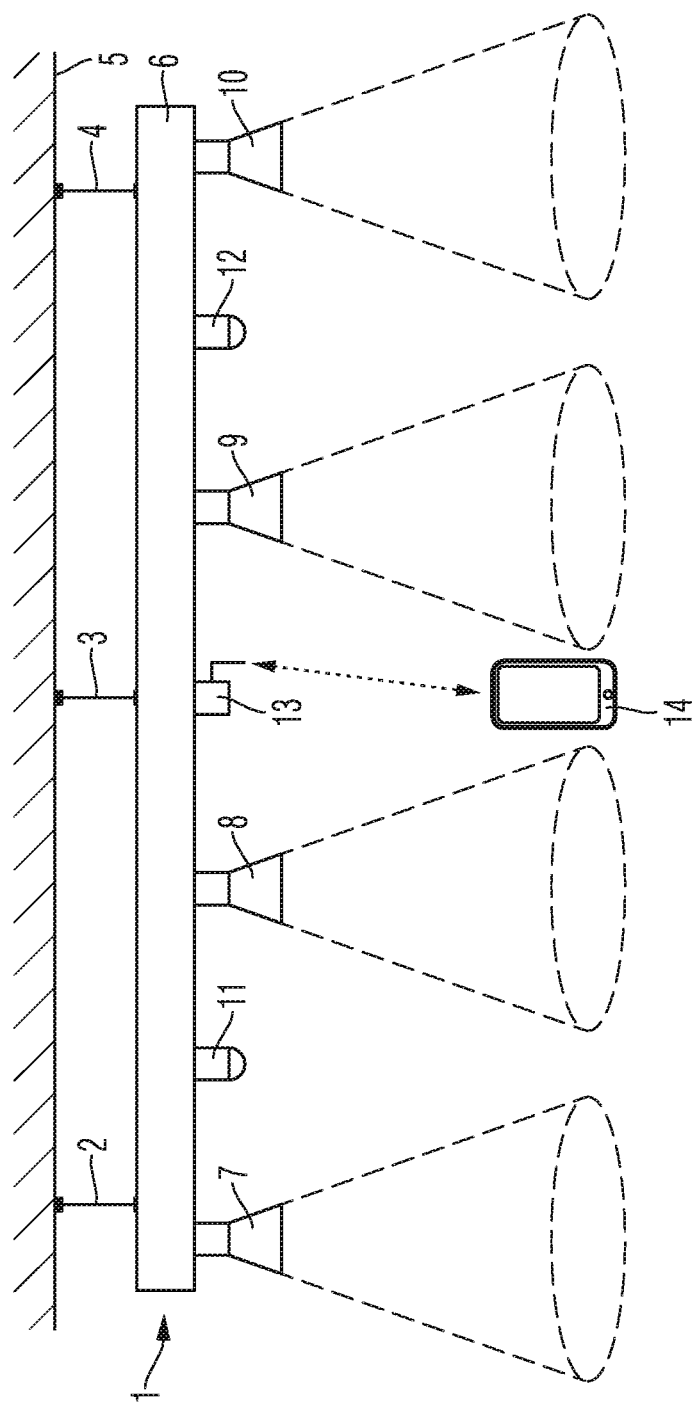
FIG. 1 is a side view of a light trunking system according to the present invention.

FIG. 1 shows a side view of a light trunking system 1 according to the present invention. The light trunking system 1 is mounted on a ceiling 5 with three steel cables 2 . . . 4 and has a trunking rail 6 connected to the steel cables 2 . . . 4, four luminaires 7 . . . 10 radiating downwards, two presence sensors 11, 12, and a radio network module 13. The luminaires 7 . . . 10, the presence sensors 11, 12, and the radio network module 13 are components of the light trunking system 1 and are held by the trunking rail 6, into which they are plugged and fixed from below at any position. The remaining open locations on the underside of the trunking rail 6 are closed off with covers (not shown).

Electrical lines (not shown) designed as busbars run in the trunking rail 6 and contact the plugged-in and fixed components 7 . . . 13, and supply power to the components 7 . . . 13. Data and control signals are also transmitted via the busbars that are contacted by the components 7 . . . 13. The power and the data and control signals are fed into the busbars by means of a busbar feeder (not shown).

The luminaires 7 . . . 10 are switched on when the presence of a person is detected by the presence sensors 11, 12. The radio network module 13 serves to provide Internet access for the WLAN-enabled device 14 located underneath the light trunking system 1 and is a wireless access point, which functions as an interface for wireless communication devices.

Figure 2:
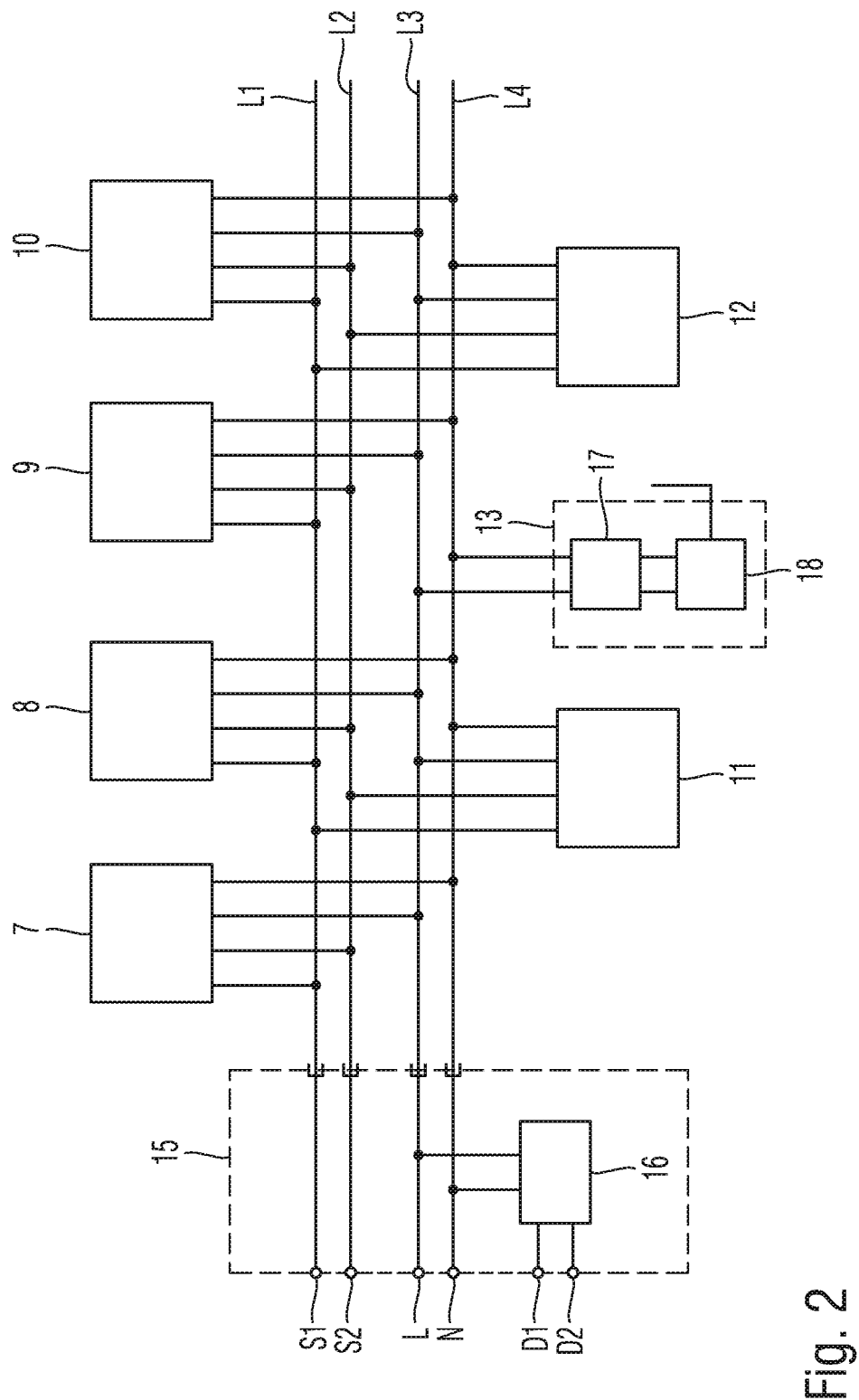
FIG. 2 is a simplified circuit of the light trunking system shown in FIG. 1.

FIG. 2 shows a simplified circuit of the light trunking system 1 shown in FIG. 1 with the busbar feeder 15. The busbar feeder 15 has two terminals S1, S2 for the connection of a two-pole control line, e.g., a DALI control line, two mains connections L, N for connection to a mains AC voltage, two data terminals D1, D2 for the connection of a data line for the Internet connection, and a first powerline adapter 16, and establishes a connection of the terminals S1, S2, L, N, D1, and D2 to the busbars L1, L2, L3, or L4—for example, by means of a plug connection. In the circuit shown in FIG. 2, only the busbars L1, L2, L3, L4 and connections S1, S2, L, N, D1, D2 relevant for the components 7 . . . 13 are shown. However, because the trunking rail 6 and the busbar feeders 15 are designed for a large number of applications, they have further busbars and connections—for example, for a possible connection of components for the emergency/safety lighting.

The luminaires 7 . . . 10 and the presence sensors 11, 12 contact the busbars L1, L2, L3, L4 or are detachably connected thereto, wherein they are supplied with power via the busbars L3, L4 and receive control signals or transmit sensor signals via the busbars L1, L2. In the example shown, the radio network module 13 is connected only to the busbars L3, L4 and has a second powerline adapter 17 and a transmitting-and-receiving unit 18.

The first powerline adapter 16 is connected to the data terminals D1, D2 and modulates the data signal received at these terminals to the mains voltage that is applied to the mains connections L, N and conducted to the busbars L3, L4 for data transmission. The data signal is modulated by the transmitting first powerline adapter 16 in the high-frequency range, e.g., from 2 MHz to 68 MHz, onto the busbars L3, L4. The second powerline adapter 17 contained in the radio network module 13 and connected to the busbars L3, L4 demodulates the data signal modulated on the mains voltage and outputs it to the transmitting-and-receiving unit 18, which transmits it to the device 14 via a WLAN connection. A data signal transmitted by the device 14 via the WLAN connection is received by the transmitting-and-receiving unit 18 and output to the second powerline adapter 17, which modulates it to the mains voltage and transmits it to the first powerline adapter 16 for a demodulation and output at the data terminals D1, D2. Alternatively, the data signal can be transmitted to/from the device 14 by means of a Bluetooth radio method.

Figure 3:
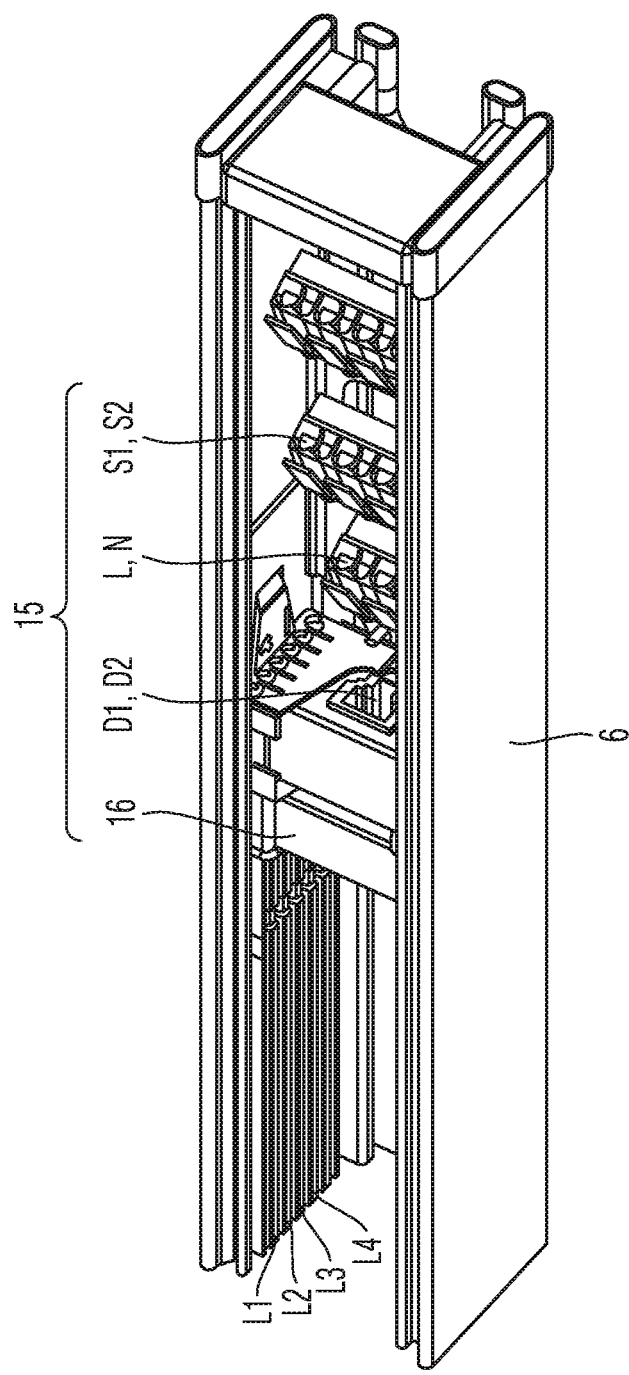
FIG. 3 is a detail of the trunking rail of the light trunking system shown in FIG. 1.

FIG. 3 shows a portion of the trunking rail 6 in which the busbar feeder 15 is mounted or inserted. The busbar feeder 15 contacts the busbars L1, L2, L3, L4 running on two, opposing inner sides of the trunking rail 6. The trunking rail 6 can consist of a ferromagnetic material with high permeability and low remanence and can counteract the passage of magnetic fields as well as provide electrical shielding. The busbars L1, L2, L3, L4 and the busbar feeders 15 with its terminals S1, S2, L, N, D1, D2 are arranged in the interior of the trunking rail 6 and are shielded from the trunking rail 6, in order to protect the surroundings from electrical and/or magnetic fields that arise. The trunking rail 6 also suppresses interference radiation from the outside on the busbars L1, L2, L3, L4 and the busbar feeder 15.

When fixed in the trunking rail 6, the components 7 . . . 13 contact the respective busbars L1, L2, L3, L4—for example, by means of a rotational tap. The radio network module 13 can be designed such that, when it is fixed to the trunking rail 6, the second powerline adapter 17 is also arranged within the trunking rail 6 or is shielded by the trunking rail 6. Thus, the powerline data transmission takes place completely within the shielding trunking rail 6. The data signal is then transmitted via a line to the transmitting-and-receiving unit 18 located outside the trunking rail 6.

Figure 4:
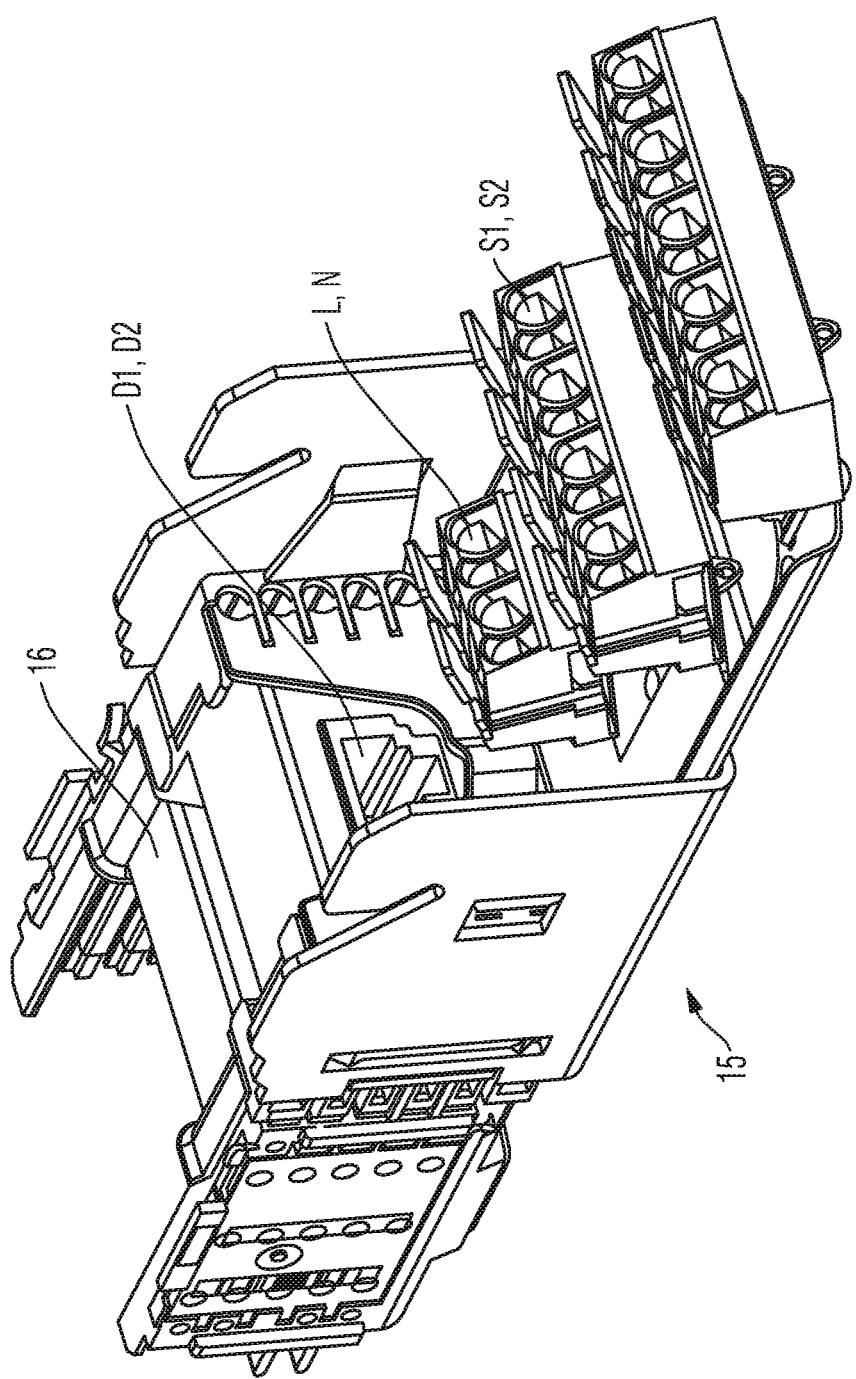
FIG. 4 is the busbar feeder mounted in the trunking rail shown in FIG. 3.

FIG. 4 shows the busbar feeder 15 mounted in the trunking rail 6 shown in FIG. 3. The data terminal D1, D2 integrated into the busbar feeder 15 is an Ethernet connection, at which a Cat line can be plugged in. The other terminals L, N, S1, S2 are designed as spring terminals. As an alternative to the wired Ethernet connection, the busbar feeder 15 can also have a radio network module 13, which receives the data signal to be fed into the busbars L3, L4 via a radio link, wherein the antenna, and in some cases also the radio network module 13, is arranged outside the shielding trunking rail 6.

Further components having a powerline adapter can be connected to the trunking rail 6 at any of several locations, wherein each adapter communicates with every other with the same authorization. Alternatively, a specific adapter, e.g., the first powerline adapter 16, can be assigned the role of central coordinator, which synchronizes the data traffic and divides the available total bandwidth dynamically among all subscribers in the network.

A component provided with a powerline adapter can, instead of the transmitting-and-receiving unit 18, also have an Ethernet connection or a USB connection for wired output of the data signal to an Internet-enabled device. Alternatively or additionally, one of the luminaires 7 . . . 10 can have a powerline adapter, and the received data signal can be transmitted from the luminaire 7 . . . 10 to a receiving device by means of Li-Fi—a method of optical data transmission. For this purpose, at least one light-emitting diode corresponding to the data to be transmitted is switched on and off very quickly in the luminaire 7 . . . 10 by a modulator, so that the human eye does not perceive it. A photodiode on the receiving device picks up the light and converts it into electrical pulses.

If the data signals to be transmitted by means of powerline via the busbars L3, L4 are image and/or audio signals, one component can have connections, such as USB, pawl socket, VGA, and/or HDMI, for outputting or inputting the image or audio signals. Alternatively or additionally, the component can have a monitor, a loudspeaker, a camera, and/or a microphone that output the received image/audio signal or generate the image/audio signal to be transmitted.

Alternatively, the received data signal can be used to control and/or monitor the component itself, so that no control signals have to be transmitted for the component via the busbars L1, L2, and the trunking rail 6 has to have only the two busbars L3 and L4, or the busbars L1, L2 can be used for other applications, such as supplying power for safety lights. For this purpose, the component has a powerline adapter and a microcontroller or another control device, which control the component on the basis of the data signal received by the powerline adapter. Alternatively or additionally, the component can generate control signals for another component on the basis of the data signal received by the powerline adapter and transmit the generated control signals to the other component by means of a radio or infrared signal connection, in order to control said other component.

The light trunking system 1 can have several trunking rails 6 that are mechanically and electrically connected to one another by means of plug connectors/switches.

The radio network module 13 is an example of a component according to the present invention that, with its second powerline adapter 17, can transmit and/or receive the data signal via the two busbars L3 and L4. In the example shown in FIG. 1, the first powerline adapter 16 and the data terminal D1, D2 are integrated into the light trunking system 1. However, it is also possible for the first powerline adapter 16 together with the data terminal D1, D2 to be located outside the light trunking system 1 and connected to the supply cable or a power supply line, which leads to the light trunking system 1 and its mains connections L, N. The first powerline adapter 16 can be located in another light trunking system, plug into a socket connected to the power supply line, or be installed in an electrical distributor (fuse box) from which the power supply line starts.

Figure 5:
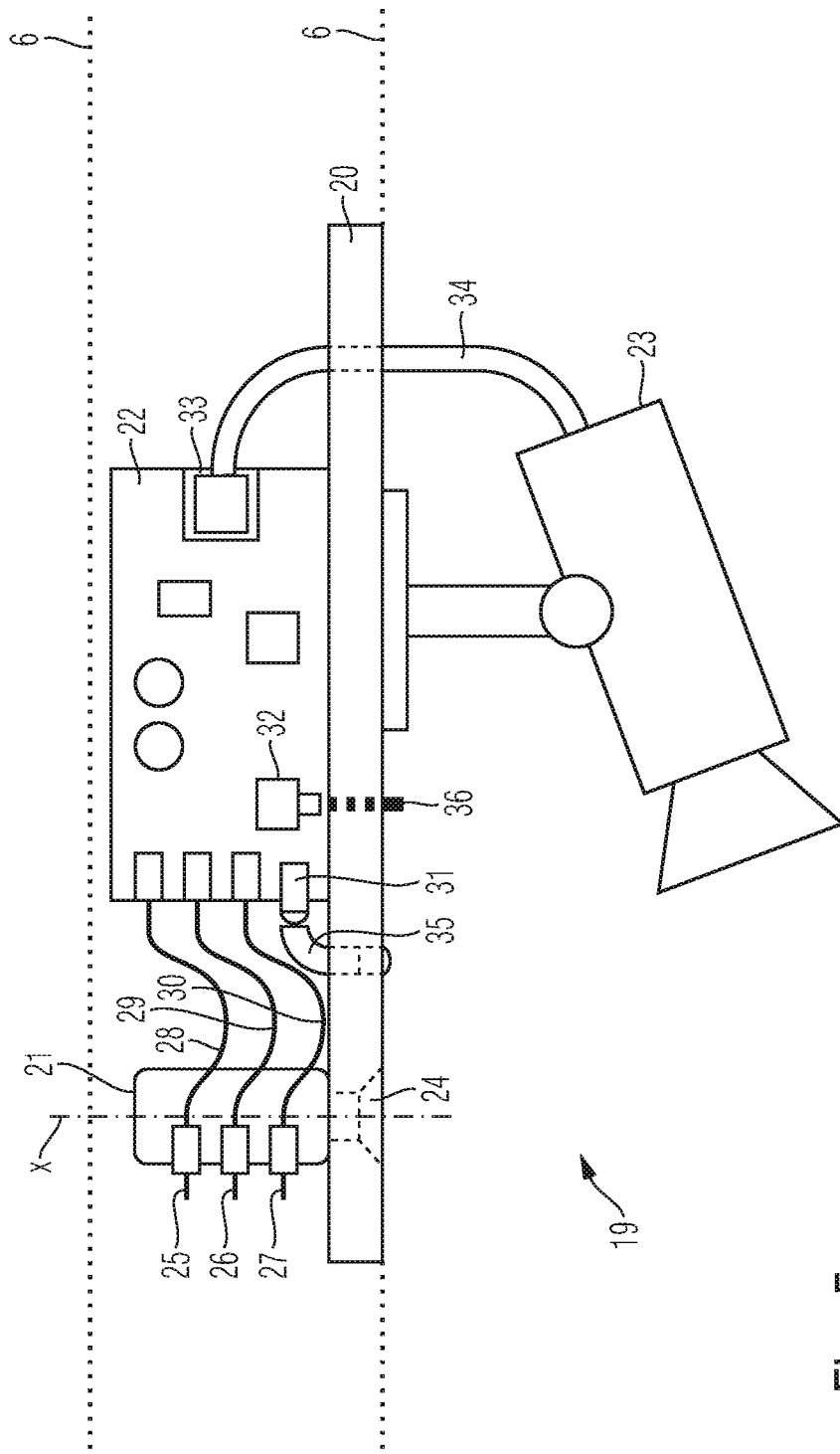
FIG. 5 is a side view of a component according to the present invention for the light trunking system shown in FIG. 1.

FIG. 5 shows another example of a component 19 according to the present invention, which can be installed in the light trunking system 1 shown in FIG. 1 or in a light trunking system having the external, first powerline adapter 16 described above. The dotted line symbolizes the trunking rail 6 into which the component 19 is inserted from below. The component 19 serves to monitor a desired region below the light trunking system 1 and has a beam element 20, a rotational tap 21, a powerline adapter 22, and a camera 23. The beam element 20 is designed as a plate and, in the inserted state, partially seals off the lower opening of the U-shaped trunking rail 6.

The rotational tap 21 fastened to the beam element 20 is, by means of a screw 24 which is accessible from the outside, rotatable about the x-axis shown in FIG. 5, wherein the contact elements 25 . . . 27 attached to the rotational tap 21 contact in each case a busbar (not shown) that runs in the trunking rail 6 when rotated 90 degrees about the x-axis. The contacted busbars are connected to the mains connections L (phase or outer conductors), N (neutral conductor), and PE (protective conductor or ground). In the contacted state, the rotational tap 21 can fix the component 19 in the trunking rail 6. Additionally or alternatively, the component 19 can be fastened to the trunking rail 6 by means of a snap-fit and/or screw connection.

A data signal transmitted via the busbars or the mains connections is received by the powerline adapter 22, which is connected to the contact elements 25 . . . 27 by means of three lines 28 . . . 30 and is attached to the beam element 20. The powerline adapter 22 is designed as a circuit board and, in addition to the known elements for the modulation and demodulation of the data signal to the mains voltage, has an indicator light (LED) 31, a pushbutton 32, and a data terminal (Ethernet connection) 33 at which a Cat line 34 running through the beam element 20 to the camera 23 is plugged in.

The indicator light 31 indicates the "connected" or "connection request" status of the connection between the first powerline adapter 16 and the powerline adapter 22 by means of different flashing frequencies or a permanent light. In order for the light of the indicator light 31 located on the circuit board to be visible to a person, the component 19 has a light guide 35, which guides the light from the indicator light 31 to the outside through the beam element 20. Further indicator lights can be located on the circuit board and display a state of the powerline adapter 22, such as "supplied with mains voltage," "overheating," or another status, and its light is guided to the outside by means of light guides.

The data are transmitted in encrypted form between the first powerline adapter 16 and the powerline adapter 22, wherein a request for the establishment of an encrypted data transmission between the first powerline adapter 16 and the powerline adapter 22 can be triggered or confirmed by means of the pushbutton 32. For this purpose, the pushbutton 32 located on the circuit board can be actuated from the outside by means of an actuating pin 38 leading through the beam element 20.

After a connection is successfully established, the powerline adapter 22 transmits the image signal received via the Cat line 34 by the camera 23 to the first powerline adapter 16, wherein power is supplied to the camera 23 via the Cat line 34 or the data terminal (PoE).

The invention claimed is:

1. A light trunking system (1), comprising:
   at least one trunking rail (6) for fastening components (7 . . . 13) of the light trunking system (1) to the trunking rail (6);
   electrical lines (L3, L4) from a mains connection, which run in the trunking rail (6) and can be contacted by the components (7 . . . 13) in order to supply power to the components (7 . . . 13);
   a data terminal (D1, D2) for receiving data; and
   a first adapter (16), which is connected to the electrical lines (L3, L4) and to the data terminal and is designed to transmit data received by the data terminal (D1, D2) to a second adapter (17) via the electrical lines (L3, L4) by modulating the data signal received at the data terminal in the high-frequency range of 2 MHz to 68 MHz onto a mains voltage that is applied to the mains connection;
   a component (13, 19) comprising:
      means for fastening the component (13, 19) to the trunking rail (6),
      means (21) for contacting the electrical lines (L3, L4), and
      the second adapter (17, 22), which is connected to the electrical lines (L3, L4) and is designed to transmit data via the electrical lines (L3, L4) to the first adapter (16) by modulating data and/or to receive data transmitted via the electrical lines (L3, L4) by demodulating data.

2. The light trunking system according to claim 1, wherein the electrical lines (L3, L4) are designed as busbars, the light trunking system (1) has a busbar feeder (15) for feeding power for the components (7 . . . 13) into the busbars, and the first adapter (16) is integrated into the busbar feeder (15).

3. The light trunking system according to claim 2, wherein the data terminal (D1, D2) is integrated into the busbar feeder (15).

4. The light trunking system according to claim 1, wherein the first adapter (16) is a powerline adapter.

5. The light trunking system according to claim 1, wherein the data terminal (D1, D2) is an Ethernet connection or a WLAN connection.

6. The light trunking system according to claim 1, wherein the electrical lines (L3, L4) in the trunking rail (6) are arranged such that they can be contacted by the components (7 . . . 13) at any location along the trunking rail (6).

7. The light trunking system according to claim 1, comprising:
   an interface (18, 33) for wired or wireless input of the data to be transmitted by the second adapter or output of the data received from the second adapter.

8. The light trunking system according to claim 7, wherein the interface (18, 33) is designed to supply power to a device connected thereto.

9. The light trunking system according to claim 1, comprising:
   a beam element (20) on which at least the means for fastening the component to the trunking rail (6) and the second adapter (17, 22) are attached and which at least partially seals off an opening in the trunking rail (6) when the component (13, 19) is fastened to the trunking rail (6).

10. The light trunking system according to claim 9, wherein
    the second adapter (17, 22) is arranged on the beam element (20) in such a way that it is located inside the trunking rail (6) when the component (13, 19) is fastened to the trunking rail (6),
    the second adapter (17, 22) has at least one indicator light (31) that indicates a specific state of the second adapter (17, 22) or a specific status of the connection between the first adapter (16) and the second adapter (17, 22), and
    the component (13, 19) has a light guide (35) for forwarding the light of the indicator light (31), wherein the light guide (35) leads from the indicator light (31) to an outer side of the beam element (20).

11. The light trunking system according to claim 9, wherein
    the second adapter (17, 22) is designed to transmit the data in encrypted form or to receive and decrypt encrypted data,
    a pushbutton (32, 36) connected to the second adapter (17, 22) is arranged on the beam element (20), by means of which pushbutton a person can activate or confirm a request for an encrypted data transmission between the first adapter (16) and the second adapter (17, 22), and/or
    a code that can be read by a machine and/or a person and by means of which the request can be activated or confirmed is applied at the beam element (20).

12. The light trunking system according to claim 1, having a control device that is designed to control the component (13, 19) based upon the received data, and/or to generate a control signal for another component (13, 19) of the light trunking system based upon the received data.

13. The light trunking system according to claim 1 wherein the means for fastening the component (13, 19) to the trunking rail (6) and means (21) for contacting the electrical lines (L3, L4) comprises a rotational tap.

\* \* \* \* \*